(12) United States Patent
Imamura et al.

(10) Patent No.: US 8,986,828 B2
(45) Date of Patent: Mar. 24, 2015

(54) MULTILAYER FILM AND METHOD FOR PRODUCING THE SAME

(75) Inventors: Naoya Imamura, Shizuoka (JP); Yasuo Enatsu, Shizuoka (JP); Mitsunori Hachisuka, Sihzuoka (JP)

(73) Assignee: FUJIFILM Corporation, Tokyo (JP)

( * ) Notice: Subject to any disclaimer, the term of this patent is extended or adjusted under 35 U.S.C. 154(b) by 752 days.

(21) Appl. No.: 13/202,064

(22) PCT Filed: Feb. 16, 2010

(86) PCT No.: PCT/JP2010/052584
§ 371 (c)(1),
(2), (4) Date: Aug. 17, 2011

(87) PCT Pub. No.: WO2010/095729
PCT Pub. Date: Aug. 26, 2010

(65) Prior Publication Data
US 2012/0034449 A1    Feb. 9, 2012

(30) Foreign Application Priority Data

Feb. 18, 2009    (JP) ................................. 2009-035064

(51) Int. Cl.
*B05D 3/02*    (2006.01)
*C08J 7/04*    (2006.01)
*C09D 183/02*    (2006.01)

(52) U.S. Cl.
CPC ... *C08J 7/04* (2013.01); *B05D 3/02* (2013.01); *C09D 183/02* (2013.01); *C08J 2367/02* (2013.01); *C08J 2443/04* (2013.01)
USPC ............ 428/331; 428/447; 428/451; 427/387

(58) Field of Classification Search
USPC ................................................ 428/331, 451
See application file for complete search history.

(56) References Cited

U.S. PATENT DOCUMENTS

| 4,223,121 A | 9/1980 | Burzynski |
| 6,696,515 B2 | 2/2004 | Yamaya et al. |

(Continued)

FOREIGN PATENT DOCUMENTS

| CN | 1387052 A | 12/2002 |
| EP | 1 327 670 A2 | 7/2003 |

(Continued)

OTHER PUBLICATIONS

Office Action for Chinese Application No. 201080008121.0, dated Feb. 17, 2013.

(Continued)

*Primary Examiner* — Ramsey Zacharia
(74) *Attorney, Agent, or Firm* — Birch, Stewart, Kolasch & Birch, LLP

(57) ABSTRACT

A multilayer film (10) is provided with a hard coat layer (12) and a film base (11) formed from a polymer compound. A heat shrinkage factor of the film base (11) (170° C., 10 minutes) is in a range from 0.05% to 3.0%. The hard coat layer (12) is formed by applying a coating liquid (33) containing a compound represented by a general formula (1), tetraalkoxysilane, acid water with pH in a range from 2 to 6, and a water-soluble hardening agent. An amount of the acid water is in a range from 60 to 2000 pts. wt. relative to a total amount 100 pts. wt. of the compound represented by the general formula (1) and tetraalkoxysilane. In the general formula (1), "$R^1$" is an organic group having 1 to 15 carbons and containing no amino group. "$R^2$" is a methyl group or ethyl group, "$R^3$" is an alkyl group having 1 to 3 carbons, and "n" is zero or 1. (1) $R^1R^2_n Si(OR^3)_{3-n}$.

10 Claims, 2 Drawing Sheets

(56) References Cited

U.S. PATENT DOCUMENTS

2002/0187324 A1    12/2002    Shoshi et al.
2003/0134951 A1*    7/2003    Yamaya et al. ............... 524/265
2007/0237964 A1    10/2007    Cheng et al.

FOREIGN PATENT DOCUMENTS

| | | |
|---|---|---|
| JP | 56-161475 A | 12/1981 |
| JP | 2003-206442 A | 7/2003 |
| JP | 2004-18811 A | 1/2004 |
| JP | 2008-245760 A | 10/2008 |
| WO | WO 2007/118024 A1 | 10/2007 |

OTHER PUBLICATIONS

Chinese Office Action for Chinese Application No. 201080008121.0 dated May 2, 2013.

Japanese Office Action dated Jun. 12, 2013 for Application No. 2009-035064.

Chinese Office Action dated Oct. 17, 2013 issued in corresponding Chinese Patent Application No. 201080008121.0 (English translation is provided).

International Search Report, dated Mar. 23, 2010, issued in PCT/JP2010/052584.

Written Opinion Of The International Searching Authority, dated Mar. 23, 2010, issued in PCT/JP2010/052584.

Chinese Office Action in corresponding Chinese Patent Application No. 201080008121.0 dated Dec. 5, 2012 (English translation is attached).

Chinese Office Action for Chinese Application No. 2010-80008121.0, dated Jun. 1, 2012.

* cited by examiner

MULTILAYER FILM AND METHOD FOR PRODUCING THE SAME

TECHNICAL FIELD

The present invention relates to a multilayer film and a method for producing this multilayer film.

BACKGROUND ART

Polymer films such as polyester films and triacetyl cellulose films are widely used by virtue of their excellent properties such as transparency and flexibility. The polymer films are used as, for example, window films applied to window panes, touch panel films, ITO substrate films, membrane switch films, 3-dimensional decoration films, and optical functional films for use in flat panel displays. Such films are frequently touched by hands, wiped with clothes, or rubbed by pens, making them susceptible to scratches. For this reason, the above polymer film is made into a multilayer film by providing a so-called hard coat layer coated on its surface before the use.

A substance containing multifunctional acrylic monomer or oligomer is frequently used as a material for a hard coat layer due to the easiness in producing the multilayer film. Such substance is hardened by the irradiation of UV rays or electron beams. A heat and moisture hardening type silica compound is also frequently used as the material for the hard coat layer. Such material is hardened by processes of hydrolysis of alkoxysilane, and dehydrating condensation of silanol generated through the hydrolysis. With the use of the above described materials, a hard coat layer having a sufficient hardness can be formed. However, high amounts of organic solvents contained in a coating liquid which is formed into the hard coat layer are detrimental to environment.

For this reason, an emulsion in which acrylic oligomer is dispersed in water is developed as a coating liquid for forming a hard coat layer.

For example, in Japanese Patent Laid-Open Publication No. 56-161475, it is suggested to use a silanol solution as a coating liquid. The silanol solution is prepared by hydrolysis of a silica compound, specifically, multifunctional alkoxysilane, utilizing water and generated alcohol as solvents. After the application of this coating liquid, a coating layer with high hardness is formed by dehydrating condensation of the silanol in the silanol solution.

However, in a case where a coating layer is formed from the emulsion of acrylic oligomer and water, molecules in the coating layer have hydrophilic groups. Accordingly, the coating layer has higher moisture absorption compared to a coating layer made from a coating liquid in which high amounts of multifunctional acrylic monomer or oligomer is dissolved in an organic solvent. As a result, hardness of the coating layer made from the emulsion of acrylic oligomer and water gradually decreases in high humidity environment, and such hard coat layer lacks sufficient hardness. According to the method described in Japanese Patent No. 1390968, during drying and hardening, the coating layer shrinks due to dehydrating condensation of silanol, resulting in cracks on the coating layer. The cracks remain on the produced hard coat layer. The hard coat layer with the cracks lacks durability and has low optical transmittance.

An object of the present invention is to provide a multilayer film having a hard coat layer and a method for producing this multilayer film. This hard coat layer has high surface hardness, and is excellent in optical transmission, scratch resistance and durability even though the hard coat layer is formed with a water-based coating liquid. Drying of the coating layer formed from the water-based coating liquid has little effect on environment.

DISCLOSURE OF INVENTION

In order to achieve the above objects and other objects, a multilayer film of the present invention includes a film base and a hard coat layer. The film base is formed from a polymer compound. A heat shrinkage factor of the film base after being heated at 170° C. for 10 minutes is in a range from 0.05% to 3.0%. The hard coat layer is formed by applying a water-based coating liquid onto the film base and drying the applied coating liquid. The coating liquid contains a water soluble hardening agent and alkoxysilane aqueous solution in which an organic silicon compound represented by a general formula (1) and tetraalkoxysilane are dissolved in an acid aqueous solution having a pH in a range from 2 to 6. The hardening agent promotes dehydrating condensation of silanol generated by hydrolysis of the organic silicon compound and the tetraalkoxysilane. An amount of the acid aqueous solution is in a range from 60 parts by weight to 2000 parts by weight where a total amount of the organic silicon compound and the tetraalkoxysilane is 100 parts by weight.

$$R^1R^2_nSi(OR^3)_{3-n} \quad (1)$$

("$R^1$" is an organic group having 1 to 15 carbons and containing no amino group. "$R^2$" is a methyl group or ethyl group. "$R^3$" is an alkyl group having 1 to 3 carbons. "n" is zero or 1.)

It is preferable that the tetraalkoxysilane is one of tetramethoxysilane and tetraethoxysilane. It is preferable that the hardening agent is a compound containing at least one of boron, phosphorus, and aluminum. It is preferable that the polymer compound is polyethylene terephthalate or polyethylene naphthalate.

It is preferable that the coating liquid contains colloidal silica whose colloidal particles dispersed in water has an average particle diameter in a range from 3 nm to 50 nm. It is preferable that the coating liquid contains a water soluble or water dispersible polymer. It is preferable that the film base has an adhesion layer on its surface onto which the coating liquid is to be applied. The adhesion layer has a refractive index in a range from 1.54 to 1.64.

A method for producing a multilayer film includes a dissolving step, a preparing step, and an applying step. In the dissolving step, an organic silicon compound represented by the above general formula (1) and tetraalkoxysilane are dissolved in an acid aqueous solution having a pH in a range from 2 to 6. An amount of the acid aqueous solution is in a range from 60 parts by weight to 2000 parts by weight where a total amount of the organic silicon compound and the tetraalkoxysilane is 100 parts by weight. In the preparing step, a water-based coating liquid is prepared by adding a water soluble hardening agent to alkoxysilane aqueous solution obtained by the dissolution in the dissolving step. In the applying step, the coating liquid is applied onto the film base formed from a polymer compound, and the applied coating liquid is dried to form the hard coat layer. A heat shrinkage factor of the film base after being heated at 170° C. for 10 minutes is in a range from 0.05% to 3.0%. The hardening agent promotes dehydrating condensation of silanol generated by hydrolysis of the organic silicon compound and the tetraalkoxysilane.

It is preferable that the applied coating liquid is heated to a temperature in a range from 160° C. to 220° C. and dried.

According to the present invention, the hard coat layer is formed from the water-based coating liquid. When a coating layer of the water-based coating liquid is dried, water and a small amount of alcohol evaporate therefrom. Thus, the environmental load is significantly small compared to the coating liquid using an organic solvent. Although the hard coat layer is formed from the water-based coating liquid, the produced multilayer film is provided with the hard coat layer having high surface hardness, high optical transmission, excellent scratch resistance, and excellent durability.

BEST MODE FOR CARRYING OUT THE INVENTION

Hereinafter, a multilayer film of the present invention is described with referring to an embodiment which is an example of the present invention and does not limit the scope of the invention.

Figure 1:
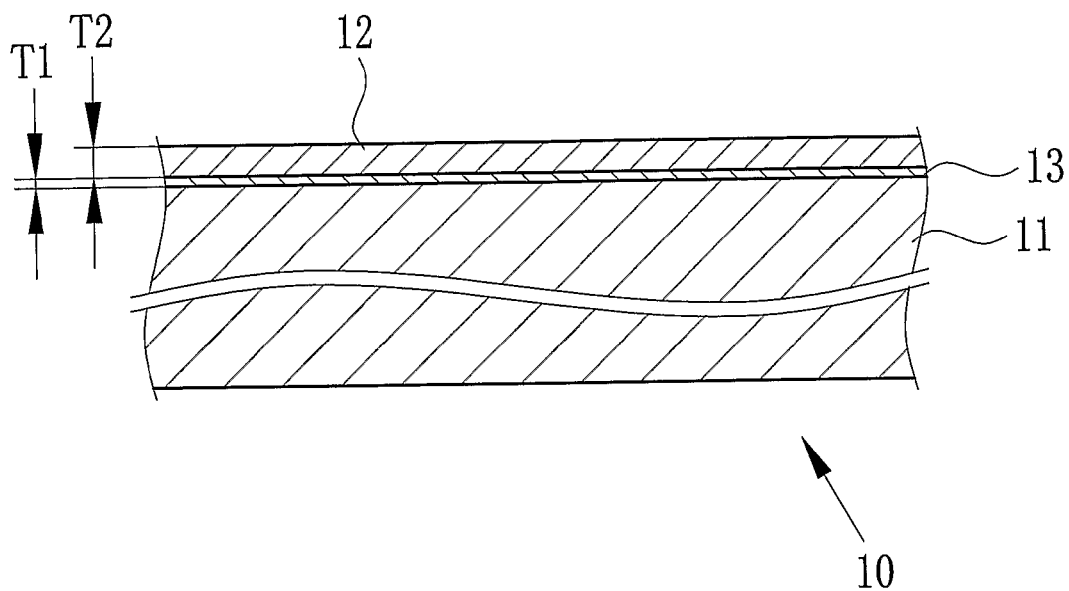
FIG. 1 is a cross-sectional view of a multilayer film of the present invention.

As shown in FIG. 1, a multilayer film 10 has a film base 11, a hard coat layer 12 and an adhesion layer 13. The film base 11 is formed from a polymer compound. The hard coat layer 12 protects at least one of surfaces of the film base 11. The adhesion layer 13 increases adhesion between the film base 11 and the hard coat layer 12. The adhesion layer 13 may be provided depending on the adhesion between the film base 11 and the hard coat layer 12, and not necessarily be provided.

Film Base

The film base 11 is a film made from a polymer compound by a melt casting method or a solution casting method, for example. Polymer compounds used for forming the film base 11 are not particularly limited. Preferable examples of the polymer compounds include polyethylene terephthalate (PET), polyethylene naphthalate (PEN), polybutylene terephthalate (PBT), polybutylene naphthalate (PBN), polyarylates, polyether sulfone, polycarbonate, polyetherketone, polysulfone, polyphenylene sulfide, polyester liquid crystal polymer, triacetyl cellulose, cellulose derivatives, polypropylene, polyamids, polyimid, polycyclo olefins and the like.

Of those, PET, PEN, triacetyl cellulose, and cellulose derivatives are preferable, and PET and PEN are particularly preferable.

A so-called biaxially stretched polymer film is preferably used as the film base 11. The biaxially stretched polymer film is produced by stretching a long film made from the above described polymer compound in two directions, a lengthwise direction and a widthwise direction, orthogonal to each other. The biaxially stretched polymer films made from PET and/or PEN are particularly preferable in view of elastic modulus and transparency.

The surface of the film base 11 may be subjected to corona processing. Thereby, the surface of the film base 11 is made hydrophilic, which improves wettability of a water-based coating liquid. As a result, the adhesion between the film base 11 and the hard coat layer 12 or that between the film base 11 and the adhesion layer 13 is further increased.

A heat shrinkage factor of the film base 11 is preferably in a range from 0.05% to 3.0%, more preferably in a range from 0.1% to 2.5%, and further preferably in a range from 0.4% to 2.0%. The heat shrinkage factor is expressed as a percentage and obtained after the film base 11 is heated at 170° C. for 10 minutes. The hard coat layer 12 is formed by applying a predetermined water-based coating liquid directly onto the film base 11 or onto the adhesion layer 13, and hardening the applied coating liquid or coating layer by heating it to at least 160° C. and drying it. During the heating and hardening process, the coating layer shrinks or contracts due to dehydrating condensation of silanol contained therein. With the use of the film base 11 having the heat shrinkage factor in the above range, the hard coat layer 12 is formed without cracking. This is because the film base 11 slightly deforms or shrinks in accordance with the shrinkage of the coating layer during the hardening, namely, the film base 11 follows the shrinkage of the coating layer until the coating layer finally becomes the hard coat layer 12. For this reason, the heat shrinkage factor of the film base 11 is based on the temperature the same as or close to the temperature to harden the coating layer, and in this case, 170° C. Duration of the heating for measuring the heat shrinkage factor of the film base 11 is preferably 10 minutes so as to avoid measurement errors. The duration may be longer than 10 minutes. However, the duration longer than 10 minutes has no particular advantage.

In a case where the heat shrinkage factor of the film base 11 is lower than 0.05%, the film base 11 cannot deform itself enough to follow the hardening and shrinking of the coating layer. Due to the difference in the heat shrinkage factor between the film base 11 and the coating layer, the coating layer cracks. In a case where the heat shrinkage factor of the film base 11 is higher than 3%, the cracking of the coating layer does not occur. However, such film base 11 deforms excessively, causing the multilayer film to be bent or warped. As a result, the multilayer film may become unsaleable.

The heat shrinkage factor is measured as follows. First, a sample for the measurement is taken from the film base 11. A length L1 of the sample in a predetermined direction is measured. Thereafter, the sample is left for 10 minutes without application of tension in a constant temperature device kept at 170° C. For example, a heat oven into which heated air is fed to keep the inside at a predetermined temperature may be used as the constant temperature device. After the sample is cooled, a length L2 of the sample is measured in the same direction as the measurement of the length L1 performed prior to the heating. The heat shrinkage factor (unit: %) is calculated by a mathematical expression: $100 \times (L1-L2)/L1$. In the present invention, the measurement method of the heat shrinkage factor is not limited to the above. In a case where a measurement method different from the above is used, relations between the values measured by the above method and those measured by the method used are obtained. Based on the obtained relations, it is checked whether the values measured by the method used satisfy the above range.

In a case where the adhesion layer 13 is provided, the heat shrinkage factor of the film base 11 having the adhesion layer 13 is within the above range.

Adhesion Layer

The adhesion layer 13 is provided on the film base 11 as necessary to improve the adhesion between the film base 11 and the hard coat layer 12. The adhesion layer 13 is formed by applying a coating liquid onto a surface of the film base 11. The coating liquid for the adhesion layer 13 contains a binder, a hardening agent and a surfactant. Organic or inorganic fine particles may be added to the adhesion layer 13 as necessary.

The binder used for the adhesion layer 13 is not necessarily limited. It is preferable to use at least one of polyester, polyurethane, acrylic polymer and styrene butadiene copolymer as the binder in view of adhesion. It is particularly preferable to use water soluble or water dispersible binder to reduce environmental loads.

Fine particles of metal oxides may be added to the adhesion layer 13 for the purpose of adjusting the refractive index of the adhesion layer 13. Metal oxides with high refractive indices, for example, tin oxide, zirconium dioxide, zinc oxide, titanium dioxide, cerium oxide and niobium oxide are preferable, because the refractive index of the adhesion layer 13 can be changed with a small amount of such fine particles. The particle diameter of the fine particles of the metal oxides is preferably in a range from 1 nm to 50 nm, and particularly preferably in a range from 2 nm to 40 nm. The metal oxides to be used is determined to meet a required refractive index of the adhesion layer 13. An amount of the fine particles of the metal oxides contained in the adhesion layer 13 is preferably in a range from 10 to 90 and particularly preferably in a range from 30 to 80 in a case where the total weight of the adhesion layer 13 is represented as 100.

The refractive index of the adhesion layer 13 is preferably in a range from 1.54 to 1.64 for the purpose of reducing interference colors caused by light irradiated onto the multilayer film 10. In a case where the refractive index of the adhesion layer 13 is less than 1.54 or exceeds 1.64, the effect of reducing the interference colors is small.

A thickness T1 of the adhesion layer 13 is controlled by adjusting a coating amount of the coating liquid for forming the adhesion layer 13. To impart excellent transparency and adhesion properties to the adhesion layer 13, the thickness T1 is preferably uniform across the adhesion layer 13 in a range from 0.01 μm to 5 μm. In a case where the thickness T1 is less than 0.01 μm, the adhesion properties may not be sufficient. In a case where the thickness T1 exceeds 5 μm, it is difficult to form the adhesion layer 13 with the uniform thickness T1. In addition, the amount of the coating liquid increases and drying time extends, resulting in cost increase. It is more preferable that the thickness T1 is in a range from 0.02 μm to 3 μm. To reduce the interference colors, as is the case with the refractive index, the thickness T1 is preferably in a range from 0.01 μm to 0.5 μm. In a case where the thickness T1 is less than 0.01 μm or exceeds 0.5 μm, the adhesion layer 13 has little effect in reducing the interference colors. It should be noted that the adhesion layer 13 may be a single layer or composed of multiple adhesion layers 13. In a case where the multiple adhesion layers 13 are used, the thickness T1 is the total thickness of the multiple adhesion layers 13.

Hard Coat Layer

The hard coat layer 12 is formed with a coating liquid containing an organic silicon compound, tetraalkoxysilane, an acid aqueous solution (hereinafter referred to as acid water), and a water soluble hardening agent. The coating liquid is formed into a coating layer, and hardened by heating and drying. With the use of the organic silicon compound and the tetraalkoxysilane, cross-linking density is increased due to the dehydrating condensation of the silanol, and becomes higher than in the case of using a conventional material for the hard coat layer. Thus, the high-hardness hard coat layer 12 is formed.

A thickness T2 of the hard coat layer 12 is controlled by adjusting a coating amount of the coating liquid. The thickness T2 is preferably uniform across the hard coat layer 12 in a range from 0.3 μm to 12 μm in view of hardness. In a case where the thickness T2 is less than 0.3 μm, the hard coat layer 12 may not have sufficient hardness to function as the hard coat layer 12. In a case where the thickness T2 exceeds 12 μm, deformation such as curls may be formed in the multilayer film 10 due to internal stress in the hard coat layer 12. The thickness T2 of the hard coat layer 12 is more preferably in a range from 0.5 μm to 10 μm.

Organic Silicon Compound

An organic silicon compound as a first component or constituent of the coating liquid for forming the hard coat layer 12 is divalent or trivalent alkoxysilane having an organic group and an alkoxy group. This organic silicon compound is represented by a general formula (1) below.

$$R^1R^2_nSi(OR^3)_{3-n} \quad (1)$$

("$R^1$" is an organic group having 1 to 15 carbons and containing no amino group. "$R^2$" is a methyl group or an ethyl group. "$R^2$" is an alkyl group having 1 to 3 carbons. "n" is zero or 1.)

Preferable examples of the organic silicon compounds represented by the general formula (1) include 3-glycidoxypropyl trimethoxysilane, 2-(3,4-epoxycyclohexyl) ethyltrimethoxysilane, vinyltrimethoxysilane, 3-methacryloxy propyl trimethoxysilane, 3-acryloxypropyl trimethoxysilane, 3-chloropropyl trimethoxysilane, 3-ureidopropyl trimethoxysilane, propyltrimethoxysilane, phenyltrimethoxysilane, 3-glycidoxypropyl triethoxysilane, 2-(3,4-epoxycyclohexyl) ethyltriethoxysilane, vinyl triethoxysilane, 3-methacryloxy propyl triethoxysilane, 3-acryloxypropyl triethoxysilane, 3-chloropropyl triethoxysilane, 3-ureidopropyl triethoxysilane, propyltriethoxysilane, phenyltriethoxysilane, 3-glycidoxypropyl methyldimethoxysilane, 2-(3,4-epoxycyclohexyl) ethylmethyldimethoxysilane, vinyl methyldimethoxysilane, 3-methacryloxy propyl methyldimethoxysilane, 3-acryloxypropyl methyldimethoxysilane, chloropropyl methyldimethoxysilane, propyl methyldimethoxysilane, phenyl methyldimethoxysilane, 3-glycidoxypropyl methyldiethoxysilane, 2-(3,4-epoxycyclohexyl) ethylmethyldiethoxysilane, vinyl methyldiethoxysilane, 3-methacryloxy propyl methyldiethoxysilane, 3-acryloxypropyl methyldiethoxysilane, chloropropyl methyldiethoxysilane, propyl methyldiethoxysilane, phenyl methyldiethoxysilane, 3-trimethoxysilylpropyl-2-[2-(methoxyethoxy)ethoxy]ethylurethane, 3-triethoxysilylpropyl-2-[2-(methoxyethoxy)ethoxy]ethylurethane, 3-trimethoxysilylpropyl-2-[2-(methoxypropoxy) propoxy]propylurethane, and 3-triethoxysilylpropyl-2-[2-(methoxypropoxy)propoxy]propylurethane.

Of those, particularly preferable is trialkoxysilane (n=0), for example, 3-glycidoxypropyl trimethoxysilane, 3-chloropropyl trimethoxysilane, 2-(3,4-epoxycyclohexyl) ethyltrimethoxysilane, 3-ureidopropyl triethoxysilane, 3-trimethoxysilylpropyl-2-[2-(methoxyethoxy)ethoxy]ethylurethane, and 3-trimethoxysilylpropyl-2-[2-(methoxypropoxy) propoxy]propylurethane.

The organic silicon compound represented by the general formula (1) has the organic group $R^1$. This organic group $R^1$ contains no amino group. If the $R^1$ has an amino group, when the organic silicon compound represented by the general formula (1) and the tetraalkoxysilane are mixed and hydrolyzed, the dehydrating condensation of the silanol generated by the hydrolysis is promoted. As a result, the coating liquid becomes unstable. The $R^1$ is the organic group having a molecular chain length of 1 to 15 carbons. The number of carbons is preferably in a range from 3 to 15, more preferably in a range from 5 to 13 so as to improve the toughness of the hard coat layer 12 and the adhesion between the hard coat layer 12 and the film base 11 or the adhesion layer 13. In a case where the number of carbons is 16 or more, the hard coat layer 12 may be too soft for certain uses.

It is preferable that the organic group $R^1$ contains a heteroatom such as oxygen, nitrogen or sulfur. The organic group $R^1$ containing the heteroatom further improves the adhesion between the hard coat layer 12 and the film base 11 or the adhesion layer 13. In particular, it is preferable that the organic group $R^1$ contains epoxy group, amide group, urethane group, urea group, ester group, hydroxy group, carboxy group and the like. Of those, an organic silicon compound containing the epoxy group is particularly preferable because it stabilizes the silanol in the acid water.

Tetraalkoxysilane

Using tetraalkoxysilane as a second component or constituent of the coating liquid increases cross-linking density resulting from the dehydrating condensation of the silanol generated by the hydrolysis of the organic silicon compound represented by the general formula (1) and tetraalkoxysilane. Thereby, the hard coat layer 12 with the higher hardness is formed compared to the conventional one. The tetraalkoxysilane is not particularly limited. However, those with 1 to 4 carbons are more preferable, and tetramethoxysilane and tetraethoxysilane are particularly preferable. In a case where the tetraalkoxysilane has 5 or more carbons, the hydrolysis rate of tetraalkoxysilane may become too slow when the tetraalkoxysilane is mixed into the acid water. As a result, it may take a longer time for dissolution to obtain a uniform aqueous solution.

A percentage of weight of the tetraalkoxysilane is calculated by a mathematical expression $100 \times X2/(X1+X2)$ where X1 is a weight of the organic silicon compound represented by the general formula (1) and X2 is a weight of the tetraalkoxysilane. The weight percentage of the tetraalkoxysilane is preferably in a range from 20% to 95%, and particularly preferably in a range from 30% to 90%. Containing the tetraalkoxysilane with the above weight percentage increases cross-linking density. As a result, the hard coat layer 12 with the sufficient hardness and improved toughness is formed. In a case where the weight percentage is less than 20%, the cross-linking density may become too low such that the hard coat layer 12 may not be hardened enough. In a case where the weight percentage exceeds 90%, the cross-linking density may become too high such that the hard coat layer 12 may have low flexibility or become brittle.

Acid Water

The acid water as a third component or the constituent of the coating liquid has a hydrogen ion exponent (pH) in a range from 2 to 6 at a so-called room temperature (25° C.). An aqueous solution or alkoxysilane aqueous solution is made by mixing the organic silicon compound represented by the general formula (1) and the tetraalkoxysilane into the acid water. In a case where the pH of the acid water is less than 2 or exceeds 6, after the silanol is generated by the hydrolysis of alkoxysilane in the alkoxysilane aqueous solution, the dehydrating condensation of the silanol is promoted and the viscosity of the alkoxysilane aqueous solution is increased.

The acid water is prepared by dissolving organic acid or inorganic acid in water. The acid is not particularly limited. For example, organic acids such as acetic acid, propionic acid, formic acid, fumaric acid, maleic acid, oxalic acid, malonic acid, succinic acid, citric acid, malic acid and ascorbic acid, and inorganic acids such as hydrochloric acid, nitric acid, sulfuric acid, phosphoric acid and boric acid can be used. Of those, acetic acid is preferable in view of handling properties. The pH is preferably in a range from 2 to 6, and more preferably in a range from 2.5 to 5.5.

The alkoxysilane aqueous solution is prepared to contain 100 parts by weight (pts. wt.) of alkoxysilane (namely, a total of 100 pts. wt. of the organic silicon compound represented by the general formula (1) and the tetraalkoxysilane) and the acid water in an amount in a range from 60 pts. wt. to 2000 pts. wt. With this composition, the hydrolyzed aqueous solution of alkoxysilane is obtained. This hydrolyzed aqueous solution has excellent hydrolytic properties, and the generated silanol remains stable. A coating liquid prepared from such hydrolyzed aqueous solution has excellent stability even though it is water-based. Therefore, it has little limitation on a storage time before the production of the multilayer film 10. In addition, it becomes unnecessary to adapt the production conditions to the changes in properties of the coating liquid during continuous production. An amount of the acid water is more preferably in a range from 100 pts. wt. to 150 pts. wt., and particularly preferably in a range from 150 pts. wt. to 1200 pts. wt. relative to 100 pts. wt. of the alkoxysilane or the total amount of the organic silicon compound represented by the general formula (1) and the tetraalkoxysilane. In a case where the acid water is less than 60 pts. wt. relative to 100 pts. wt. of alkoxysilane, gelation of the aqueous solution tends to proceed due to the dehydrating condensation of the silanol generated by hydrolysis of the alkoxysilane. On the other hand, in a case where the acid water exceeds 2000 pts. wt., concentration of alkoxysilane in the coating liquid becomes too low. In that case, a coating amount needs to be increased to form the hard coat layer 12 with a sufficient thickness. As a result, the thickness of the coating layer becomes uneven and/or a drying time of the coating layer becomes too long.

Additionally, a silane compound different from the organic silicon compound represented by the general formula (1) and the tetraalkoxysilane may be added to the coating liquid. In this case, it is preferable to mix the total 100 pts. wt. of the organic silicon compound represented by the general formula (1), the tetraalkoxysilane, and the silane compound into the acid water in an amount in a range from 60 pts. wt. to 2000 pts. wt.

Hardening Agent

A water soluble hardening agent as a fourth component or constituent of the coating liquid promotes the dehydrating condensation of the silanol generated by the hydrolysis of the organic silicon compound represented by the general formula (1) and the tetraalkoxysilane, and formation of siloxane bonds. Water soluble inorganic acid, water soluble organic acid, water soluble organic salt, water soluble inorganic salt, water soluble metal alkoxide, or water soluble metal complex can be used as the water soluble hardening agent.

Examples of the inorganic acid include boric acid, phosphoric acid, hydrochloric acid, nitric acid and sulfuric acid. Examples of the organic acid include acetic acid, formic acid, oxalic acid, citric acid, malic acid and ascorbic acid. Examples of the organic salts include aluminum acetate, aluminum oxalate, zinc acetate, zinc oxalate, magnesium acetate, magnesium oxalate, zirconium acetate and zirconium oxalate. Examples of the inorganic salts include aluminum chloride, aluminum sulfate, aluminum nitrate, zinc chloride, zinc sulfate, zinc nitrate, magnesium chloride, magnesium sulfate, magnesium nitrate, zirconium chloride, zirconium sulfate and zirconium nitrate. Examples of the metal alkoxides include aluminum alkoxide, titanium alkoxide and zirconium alkoxide. Examples of the metal complexes include aluminum acetylacetonate, aluminum ethylacetoacetate and titanium acetylacetonate and titanium ethylacetoacetate. Of those, a compound containing boron such as boric acid, a compound containing phosphorus such as phosphoric acid, and a compound containing aluminum such as aluminum alkoxide and aluminum acetylacetonate are preferable in view of water solubility and stability in water, and at least one of them is preferably used as the hardening agent.

The hardening agent is preferably mixed and dissolved uniformly in the coating liquid. It is preferable that the hardening agent dissolves in water which is used as the solvent for the coating liquid of the present invention. In a case where the hardening agent has low solubility in water, the hardening agent as solid matter may remain even after drying of the coating layer. As a result, the hard coat layer 12 may have low transparency.

An amount of the hardening agent is preferably in a range from 0.1 pts. wt. to 20 pts. wt., more preferably in a range from 0.5 pts. wt. to 10 pts. wt., and particularly preferably in a range from 1 pts. wt. to 8 pts. wt. relative to 100 pts. wt. of alkoxysilane containing the organic silicon compound represented by the general formula (1) and the tetraalkoxysilane.

Colloidal Silica

Colloidal silica may be contained in the coating liquid in addition to the above-described first to fourth components. The colloidal silica is a colloid in which silicon dioxide or its hydrate is dispersed in water. An average particle diameter of the colloidal particles is in a range from 3 nm to 50 nm. Thereby, hardness of the hard coat layer 12 is further increased. The colloidal silica does not affect coating conditions and does not impair transparency of the multilayer film 10. In a case where the average particle diameter of the colloidal particles is less than 3 nm, viscosity of the coating liquid may become too high, which may affect the coating conditions. In a case where the average particle diameter exceeds 50 nm, scattering of light incident on the hard coat layer 12 increases, which may impair transparency of the multilayer film 10. The average particle diameter of the colloidal particles is preferably in a range from 4 nm to 50 nm, and more preferably in a range from 4 nm to 40 nm, and particularly preferably in a range from 5 nm to 35 nm.

It is preferable that a pH of the colloidal silica has been adjusted to be in a range from 2 to 7 when the colloidal silica is added to the coating liquid. In a case where the pH is less than 2 or exceeds 7, the silanol, namely, the hydrolysate of the alkoxysilane has little stability. As a result, the dehydrating condensation reactions of the silanol may be accelerated, which increases the viscosity of the coating liquid.

Water Soluble or Water Dispersible Polymer

Water soluble or water dispersible polymer may be contained in the coating liquid in addition to the above components. Thereby, the hard coat layer 12 with the improved toughness can be formed. It is more preferable that the pH of the water soluble or water dispersible polymer has been adjusted to be in a range from 2 to 7 when the water soluble or water dispersible polymer is added to the coating liquid. In a case where the pH is less than 2 or exceeds 7, the dehydrating condensation reactions of the silanol may proceed, which increases the viscosity of the coating liquid with time.

In view of forming the hard coat layer 12 with the improved toughness, preferable examples of water soluble or water dispersible polymer to be added to the coating liquid include styrene butadiene copolymer, acrylonitrile butadiene polymer, polyurethane, ethylene vinyl acetate copolymer, polyester, and acrylic polymer.

Antistatic Agent

To impart antistatic functions to the multilayer film 10, an ionic, for example, cationic, anionic or amphoteric (betainic) antistatic agent may be added to the coating liquid for forming the hard coat layer 12. Alternatively or in addition, metal oxide particles such as tin oxide, indium oxide, zinc oxide, titanium dioxide, magnesium oxide, or antimony oxide may be used. The ionic antistatic agent or the fine particles of the metal oxide may be contained in at least one of the coating liquid, the film base 11 and the adhesion layer 13.

Other Additives

To control surface properties, particularly, a friction coefficient of the multilayer film 10, a matting agent and/or wax may be added to the coating liquid for the hard coat layer 12. Organic and inorganic materials may be used for the matting agent. The usable materials include silica, calcium carbonate, magnesium carbonate, barium sulfate, polystyrene, polystyrene-divinyl benzene copolymer, polymethyl methacrylate, cross-linked polymethyl methacrylate, melamine, benzoguanamine and the like. Examples of waxes include paraffin wax, microwax, polyethylene wax, polyester wax, carnauba wax, fatty acid, fatty acid amide, and metal soap.

In addition, a surfactant may be added to the coating liquid for the hard coat layer 12. Thereby, coating unevenness of the coating liquid on the film base 11 or the adhesion layer 13 is prevented. As a result, the hard coat layer 12 having the uniform thickness is formed on the film base 11 or the adhesion layer 13. The type of surfactant is not particularly limited. Any aliphatic, aromatic or fluorine surfactant may be used. The surfactant may be nonionic, anionic, or cationic.

The coating liquid for the hard coat layer 12 preferably contains as little organic solvent as possible, most preferably zero wt. %, at the time of applying the coating liquid. However, a compound which acts as an organic solvent such as alcohol may be generated in the coating liquid by hydrolysis of the components contained in the coating liquid. There may be cases where an additive added to the coating liquid contains an organic solvent. If the coating liquid contains an organic solvent at the time of application, the organic solvent content in the coating liquid is preferably at most 20 wt. %, that is, 20 wt. % or less, and more preferably 15 wt. % or less, and further preferably 10 wt. % or less.

Figure 2:
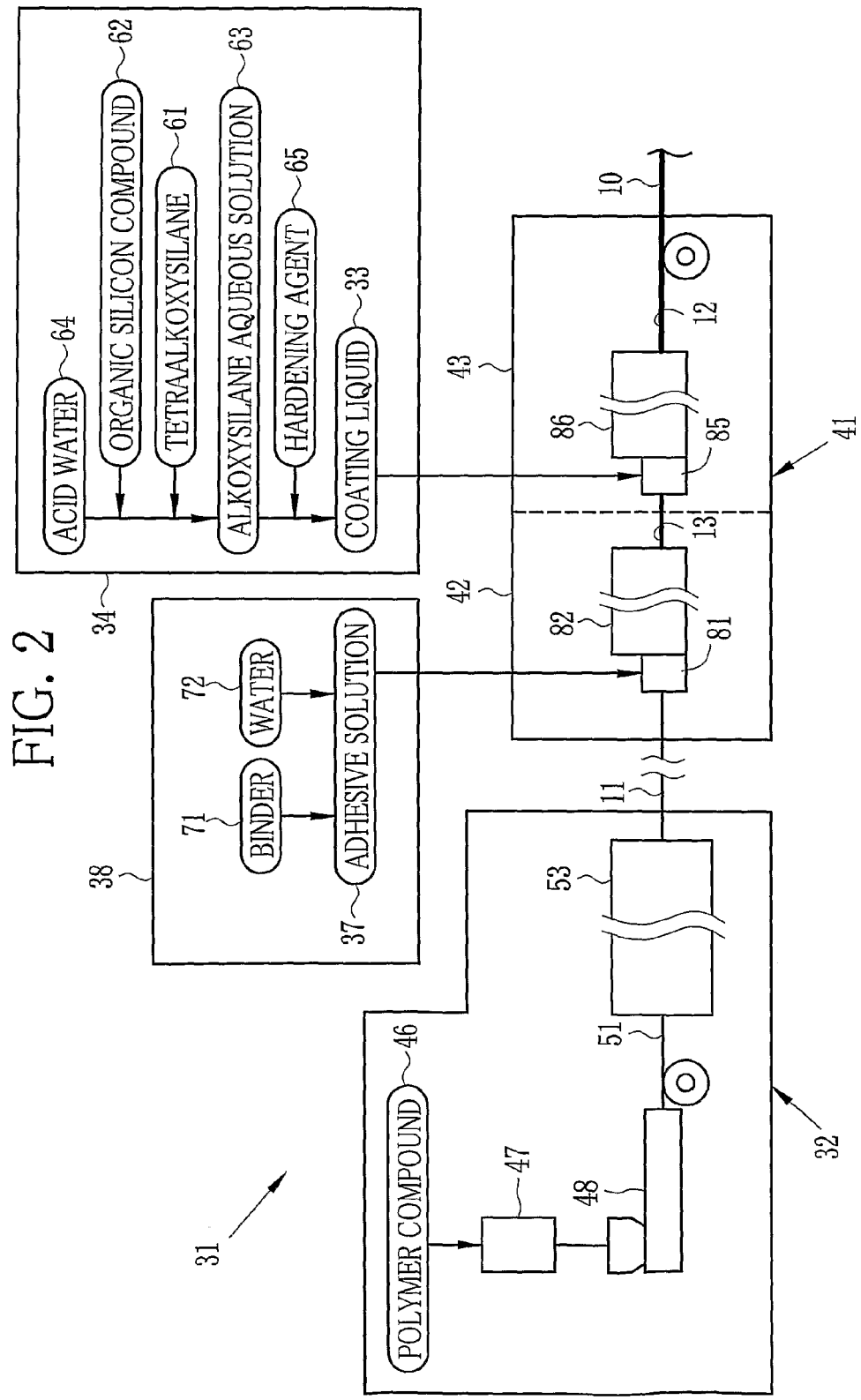
FIG. 2 is a schematic view of a multilayer film producing apparatus.

As shown in FIG. 2, a multilayer film producing apparatus 31 is provided with a base forming section 32, a coating liquid preparing section 34, an adhesive solution preparing section 38, and a film producing section 41. The base forming section 32 forms the film base 11. The coating liquid preparing section 34 prepares a coating liquid 33 for forming the hard coat layer 12. The adhesive solution preparing section 38 prepares a coating liquid (hereinafter referred to as adhesive solution) 37 to be applied onto the film base 11 to form the adhesion layer 13. The film producing section 41 produces the multilayer film 10 from the film base 11, the coating liquid 33 and the adhesive solution 37. The film producing section 41 has an adhesion layer forming section 42 and a hard coat forming section 43. The adhesion layer forming section 42 forms the adhesion layer 13 on the film base 11. The hard coat forming section 43 is provided downstream from the adhesion layer forming section 42 and forms the hard coat layer 12 on the adhesion layer 13 to produce the multilayer film 10.

In the base forming section 32, a polymer compound 46 which is a raw material of the film base 11 is used in the form of pellets, for example, and conveyed to a dryer 47 and dried therein. Thereafter, the pellets are conveyed to a melt extruder 48 which extrudes the pellets into a film. The film made from the polymer compound 46 is hereinafter referred to as base material 51. The base material 51 is introduced to a stretching device 53.

The stretching device 53 is provided with a temperature controller (not shown) to control the temperature of the base material 51 at a predetermined value. The temperature controller raises or lowers the temperature of the base material 51 while the base material 51 is conveyed such that the base material 51 reaches the predetermined temperature at a predetermined timing.

The base material 51 is subjected to a stretching process while being conveyed in the stretching device 53. In the stretching process, tension is applied to the base material 51 in predetermined directions. The stretching process includes a first stretching step, a second stretching step, a thermosetting step, a relaxation step and a cooling step. In the first stretching step, the base material 51 is stretched in the conveying direction (hereinafter referred to as MD direction). In the second stretching step, the base material 51 is stretched in the width direction (hereinafter referred to as TD direction) to increase its width. In the thermosetting step performed after the second stretching step, the base material 51 is heated to set its molecular orientation. In the relaxation step performed after the thermosetting step, the width of the base material 51 is decreased to relax the tension in the TD direction. As a result, residual distortion in the base material 51 is reduced. In the cooling step, the base material 51 is cooled. A preheating step in which the base material 51 is heated to raise its temperature to a predetermined value may be performed prior to the first stretching step. Alternatively, a known simultaneous biaxial stretching device may be incorporated in the stretching device to perform the first and second stretching steps simultaneously.

The conveying method and the stretching method of the film in the stretching device 53 are not particularly limited, and any known method may be used. For example, in the first stretching step, the base material 51 is conveyed using two rollers, a roller (hereinafter referred to as upstream roller) and a roller (hereinafter referred to as downstream roller) placed downstream from the other roller or upstream roller. Rotating the downstream roller faster than the upstream roller stretches the base material 51 in the MD direction. Adjusting the rotation speeds of the upstream and the downstream rollers controls the stretch ratio of the base material 51 in the MD direction. In the second stretching step, a stretching device is provided with clips (not shown), a pair of endless chains (not shown), and rails (not shown). The clips as holders hold side edge portions of the base material 51 to convey the base material 51. Each endless chain is provided with the plurality of clips. The rails guide the endless chains, and are provided with a shifting mechanism (not shown). When the base material 51 reaches a predetermined position in the stretching device 53, the side edge portions of the base material 51 are held with clips. The shifting mechanism moves the rails in the width direction of the base material 51, and thereby the chains are displaced or shifted accordingly. The clips on the chains are also shifted in the width direction of the base material 51 while holding the base material 51, and thereby tension is applied to the base material 51 in the width direction. Controlling the shifting of the chains changes the stretch ratio of the base material 51 in the TD direction.

Through the above described steps in the stretching device 53, the tension applied to the base material 51 in the conveying direction (MD direction) and the width direction (TD direction) is controlled while the base material 51 is conveyed. Thus, the film base 11 is formed with the heat shrinkage factor (at 170° C. for 10 minutes) of a desired range.

The forming method of the film base 11 is not limited to the above, and any known producing apparatus for polymer films can be used, for example, a common producing apparatus for polyester films disclosed in "PET film-stretching technologies, properties, evaluations, high functionality and extended applications" (published by Technical Information Institute Co., Ltd., in 1990). In a case where the film base 11 is formed from polyester, a known sequential biaxial stretching method or simultaneous biaxial stretching method is preferable. However, as long as the film has the above heat shrinkage factor (at 170° C. for 10 minutes), a uniaxially stretched film stretched only in the MD direction or a so-called non-oriented film which is not subjected to the stretching process may be used as the film base 11.

In the coating liquid preparing section 34, the coating liquid 33 is prepared from tetraalkoxysilane 61, an organic silicon compound 62 represented by the general formula (1), acid water 64, and a hardening agent 65.

The preparation process of the coating liquid 33 performed in the coating liquid preparing section 34 has a first step and a second step. In the first step, an alkoxysilane aqueous solution 63 is prepared by dissolving the organic silicon compound 62 represented by the general formula (1) and the tetraalkoxysilane 61 in the acid water 64. In the second step, the coating liquid 33 is prepared by adding the hardening agent 65 to the alkoxysilane aqueous solution 63 prepared in the first step. An additive other than the hardening agent 65 may be added to the coating liquid 33. In that case, such additive may be added in any of the first or second steps.

In the first step, a predetermined amount of the acid water 64 is previously contained in a tank. The tank is provided with a stirring device and a temperature controller for adjusting the inner temperature thereof. First, the organic silicon compound 62 represented by the general formula (1) is added to the acid water 64 while the acid water 64 is stirred vigorously using the stirring device. Next, the tetraalkoxysilane 61 is added to the acid water 64 and dissolved therein while the acid water 64 is stirred vigorously using the stirring device. Thus, the alkoxysilane aqueous solution 63 is prepared.

In the second step, the hardening agent 65 is added to the alkoxysilane aqueous solution 63 while the alkoxysilane aqueous solution 63 is stirred. In the second step, it is preferable to prevent or hinder the dehydrating condensation reactions of the generated silanol as much as possible. For this reason, it is preferable to gradually add the hardening agent 65 in small quantities while the alkoxysilane aqueous solution 63 is stirred sufficiently so as to prevent abrupt changes in pH. In addition, it is preferable to cool the alkoxysilane aqueous solution 63 so as not to raise its temperature beyond a predetermined value. An additive other than the hardening agent 65 may be added to the alkoxysilane aqueous solution 63. In that case, the additive may be added at any timing, namely, before or after the hardening agent 65 is added or simultaneously with the hardening agent 65.

In the adhesive solution preparing section 38, the adhesive solution 37 is prepared from a binder 71, a hardening agent (not shown), a surfactant (not shown), and water 72. In a case where fine particles are added to the adhesion layer 13, the fine particles are added thereto in the adhesive solution preparing section 38.

The film base 11 formed in the base forming section 32 is continuously conveyed to the adhesion layer forming section 42 of the film producing section 41. In the adhesion layer forming section 42, the adhesion layer 13 is formed on the film base 11. The adhesion layer forming section 42 is provided with a coater 81 for applying the adhesive solution 37 on the film base 11, and a dryer 82 for drying the applied adhesive solution 37. In the adhesion layer forming section 42, a coating layer of the adhesive solution 37 is formed on the film base 11 while the film base 11 is conveyed. The coating layer is dried using the dryer 82. Thus, the adhesion layer 13 is formed. In a case where the hard coat layer 12 is formed directly on the film base 11 without forming the adhesion layer 13, the adhesion layer forming section 42 is not provided.

Alternatively, the film base 11 formed in the base forming section 32 may be wound in a roll before the film base 11 is conveyed to the adhesion layer forming section 42. In that case, the roll of the film base 11 is set in a feeder (not shown), and unwound and fed by this feeder to the adhesion layer forming section 42.

The application of the adhesive solution 37 may be performed in the base forming section 32. For example, the adhesive solution 37 may be applied to the base material 51 before the base material 51 enters the stretching device 53. In a case the second stretching step is performed after the first stretching step, the application of the adhesive solution 37 may be performed between the first and second stretching steps.

The film base 11 on which the adhesion layer 13 is formed is continuously conveyed to the hard coat forming section 43. The hard coat forming section 43 has a coater 85 for applying the coating liquid 33 onto the adhesion layer 13 formed on the film base 11, and a heater 86 for drying the applied coating liquid 33 by heating. In the hard coat forming section 43, a coating layer is formed by applying the coating liquid 33 onto the film base 11 while the film base 11 is conveyed, and the applied coating layer is heated and dried using the heater 86. Thus, the hard coat layer 12 is formed.

The film base 11 may not be continuously conveyed from the adhesion layer forming section 42 to the hard coat forming section 43. After the adhesion layer 13 is formed on the film base 11 in the adhesion layer forming section 42, the film base 11 may be wound in a roll before being conveyed to the hard coat forming section 43. In that case, the roll of the film base 11 is set in a feeder (not shown), and unwound and fed by this feeder to the hard coat forming section 43.

The forming methods of the adhesion layer 13 and the hard coat layer 12 are not particularly limited. Any known coating device may be used as necessary. For example, a spin coater, a roll coater, a bar coater, or a curtain coater may be used.

The applied coating liquid 33 is heated and dried by the heater 86 such that the coating layer of the coating liquid 33 on the film base 11 is heated to at least 160° C.

To harden the coating layer sufficiently, the coating layer is preferably heated to a temperature in a range from 160° C. to 220° C., more preferably in a range from 170° C. to 220° C., and furthermore preferably in a range from 180° C. to 210° C. In a case where the temperature of the coating layer is less than 160° C., the coating layer may be insufficiently hardened. As a result, the hard coat layer 12 may not achieve sufficient hardness. It should be noted that the above upper limit (220° C.) of the temperature of the coating layer applies to the case where the polymer compound 46 of the film base 11 is polyester such as PET. The upper limit may be determined depending on the heat resistance of the film base 11 so as to avoid deformation of the film base 11 by heat.

To avoid damage by heat, it is preferable to shorten the heating time as much as possible in addition to controlling the heating temperature. The heating time is determined in consideration of a hardening rate and a heating status of the coating layer or coating liquid. In a case where the heating temperature is in the above range, the heating time is preferably in a range from 10 seconds to 5 minutes, and more preferably in a range from 20 seconds to 4 minutes.

The multilayer film 10 produced by the above described steps is sent to a next step, for example, a winding device for winding the multilayer film 10 in a roll, a sheet forming device for cutting the multilayer film 10 into sheet (s) of desired size and shape, a function providing device for imparting other functions to the multilayer film 10 or the like (all not shown).

Example 1

Hereinafter, examples and comparative examples are described. Details are described in example 1. Only conditions different from those in the example 1 are described in the rest of the examples and the comparative examples.

PET having intrinsic viscosity of 0.66 and synthesized by polycondensation using germanium (Ge) as a catalyst was dried until its water content reaches not more than 50 ppm. Thereafter, the PET was formed into the film-like base material 51 using the melt extruder 48. The melt extruder 48 was provided with a heater for melting the PET, a die for extruding the melted PET in a film or sheet shape through an extrusion opening, and a chill roller disposed downstream from the extrusion opening. The chill roller is a cooling roller having a cooling mechanism to cool the outer circumferential surface thereof. The PET film is cooled by contacting the outer circumferential surface of the chill roller. The temperature of the heater of the melt extruder 48 was kept substantially constant at a value in a range 280° C. to 300° C. The PET was melted using the heater. The melted PET was extruded on the chill roller which is electrostatically applied by the die, and formed into the amorphous base material 51. The amorphous base material 51 was conveyed to the stretching device 53 provided downstream from the melt extruder 48.

In the stretching device 53, the first stretching step, the second stretching step, the thermosetting step, the relaxation step and the cooling step were performed in this order and thereby the film base 11 was formed. In the first stretching step, the base material 51 was stretched 3.1 times as its original length in the MD direction. Thereafter, in the second stretching step, tension was applied to the base material 51 to stretch it 3.9 times as its original width in the TD direction. In the thermosetting step, the base material 51 was heated to 240° C. In the relaxation step, the base material 51 was heated to 235° C. A percentage of width reduction of the base material 51 was calculated by a mathematical expression 100× $(Y2-Y1)/Y2$ where Y1 was a width of the base material 51 at the time the base material 51 was released from clips after the cooling, and Y2 was the maximum width of the base material 51 in the second stretching step. The width of the base material 51 was reduced by 3.2(%), calculated using the above mathematical expression. In the cooling step, the base material 51 was cooled to room temperature. The thickness of the formed film base 11 was 188 μm.

The adhesive solution was prepared with the composition described below. This adhesive solution is hereinafter referred to as sample adhesive solution A.

Sample Adhesive Solution A

| | |
|---|---|
| TAKELAC WS-4000 (trade name, solid content concentration of 30%, manufactured by Mitsui Chemicals Inc.) | 5.0 pts. wt. |
| Surfactant (trade name: Naloacty HN-100, manufactured by Sanyo Chemical Industries, Ltd.) | 0.3 pts. wt. |
| Surfactant (trade name: SANDET BL, solid content concentration: 43%, manufactured by Sanyo Chemical Industries, Ltd.) | 0.3 pts. wt. |
| Water | 94.4 pts. wt. |

Corona discharge treatment was performed to one of the surfaces of the film base 11. Thereafter, the sample adhesive solution A was applied onto the same surface, and then the surface was heated and dried at 120° C. for 2 minutes. Thereby, the adhesion layer 13 with the thickness of 0.11 µm was formed.

The refractive index of the adhesion layer 13 was shown in a column "refractive index of adhesion layer" in Table 1-1. The values of the refractive indices shown in this column were theoretical values calculated from a refractive index, density and a percentage of content of each material of the adhesion layer 13.

The heat shrinkage factor (170° C., 10 minutes) of the film base 11 provided with the adhesion layer 13 was measured both in the MD direction and the TD direction. In the Table 1-1, the measurement results were shown in a column "heat shrinkage factor" of the column "film base". The column "MD" indicates the heat shrinkage factor of the film base 11 in the MD direction (unit: %). The column "TD" indicates the heat shrinkage factor of the film base 11 in the TD direction (unit: %). The heat shrinkage factor was obtained as follows. A sample having a length 120 mm in the MD direction and a width 30 mm in the TD direction was taken from the base material 51. This sample was marked with two reference lines or parallel lines extending in the TD direction. These parallel lines were spaced 100 mm apart from each other, namely, an interval between the parallel lines was 100 mm in the MD direction. The sample was left in a heating oven at 170° C. for 10 minutes without application of tension. Thereafter, the sample was cooled to a room temperature, and an interval L (unit: mm), in the MD direction, between the parallel lines was measured. The heat shrinkage factor of the sample in the MD direction was calculated using a mathematical expression: $100 \times (100-L)/100$. To obtain the heat shrinkage factor in the TD direction, a sample having a length of 30 mm in the MD direction and a width of 120 mm in the TD direction was taken from the film base 11. This sample was marked with two reference lines or parallel lines extending in the MD direction. These parallel lines were spaced 100 mm apart from each other, namely, an interval between the parallel lines was 100 mm in the TD direction. The sample was left in the heating oven at 170° C. for 10 minutes without application of tension. Then, the calculation was performed in the same manner as the above.

The coating liquid 33 used for forming the hard coat layer 12 is prepared with the composition below. Hereinafter, this coating liquid 33 is referred to as sample coating liquid A.

Sample Coating Liquid A

| | |
|---|---|
| Tetramethoxysilane (trade name: KBM-04, manufactured by Shin-Etsu Chemical Co., Ltd.) | 5.0 pts. wt. |
| 3-glycidoxypropyl trimethoxysilane (trade name: KBM - 403, manufactured by Shin-Etsu Chemical Co., Ltd.) | 3.2 pts. wt. |
| 2-(3,4-epoxycyclohexyl) ethyltrimethoxysilane (trade name: KBM-303, manufactured by Shin-Etsu Chemical Co., Ltd.) | 1.8 pts. wt. |
| Acetic acid aqueous solution (Acetic acid concentration = 0.05%, pH = 5.2) | 10.0 pts. wt. |
| Hardening agent (Boric acid, manufactured by Wako Pure Chemical Industries, Ltd.) | 0.8 pts. wt. |
| Colloidal Silica (trade name: SNOWTEX O, average particle diameter in a range from 10 nm to 20 nm, solid content concentration of 20%, pH = 2.6, manufactured by Nissan Chemical Industries, Ltd.) | 60.0 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

The sample coating liquid A was prepared in a following method. In the sample coating liquid A, as described above, 3-glycidoxypropyl trimethoxysilane and 2-(3,4-epoxycyclohexyl) ethyltrimethoxysilane were used as the organic silicon compound 62 represented by the general formula (1). First, drops of the 3-glycidoxypropyl trimethoxysilane were added to the acetic acid aqueous solution (the acid water 64) for 3 minutes while the acetic acid aqueous solution was vigorously stirred. Then, drops of the 2-(3,4-epoxycyclohexyl) ethyltrimethoxysilane were added to the acetic acid aqueous solution for 3 minutes while the acetic acid aqueous solution was vigorously stirred. Next, tetramethoxysilane as the tetraalkoxysilane 61 was added to the acetic acid aqueous solution for 5 minutes while the acetic acid aqueous solution was vigorously stirred, and the stirring was continued for 2 hours after that. Thereafter, the colloidal silica, the hardening agent 65 and the surfactants were added to this alkoxysilane aqueous solution 63 in this order, and thus the coating liquid 33 was prepared.

The sample coating liquid A was applied onto the adhesion layer 13 by a bar coating method. The applied coating liquid was heated and dried at 170° C. for 5 minutes, and thereby the hard coat layer 12 with the thickness of 4.1 µm was formed. Thus, the multilayer film 10 was produced.

The following evaluations (1) to (4) were performed on the sample coating liquid A and the produced multilayer film 10.

(1) Stability of the Coating Liquid

The number of days required for 10% increase in the viscosity of the coating liquid relative to the viscosity immediately after the preparation was measured. The longer the number of the days, the higher is the stability of the coating liquid. The increase in the viscosity of the coating liquid may require changes in production conditions, and may change physical properties of the hard coat layer 12 after the heating and drying, which are not preferable for product quality control. The results of the number of days were shown in a column "stability" in the Table 1-2. A numeral in each cell indicates the number of days the coating liquid required to increase its viscosity by 10%. For example, "20 or more" indicates that at least 20 days has passed to increase the viscosity of the coating liquid by 10%.

(2) Presence and Extent of Cracks in the Hard Coat Layer 12

The hard coat layer 12 was visually inspected and evaluated by the following criteria. The larger the number of the cracks and the wider the distribution of the cracks across the hard coat layer 12, the more deteriorated are the optical transmission, durability and appearance of the hard coat layer 12. The results are described in the column of "cracks" in the Table 1-2.

A: Free from cracks

B: Cracks are formed partially on the hard coat layer 12, but the produced multilayer film 10 is usable in certain applications C: Cracks are formed all over the hard coat layer 12, and the produced multilayer film 10 is not saleable (3) Film Hardness by Pencil Test Film hardness of the hard coat layer 12 was measured by a pencil test compliant with JIS K5600-5-4 corresponding to ISO 15184 using a reciprocating abrasion tester "Tribogear" (registered trademark, type: 30S, manufactured by Shinto Scientific Co., Ltd.). The travel speed of the tester was 0.5 mm/second, and a load was 750 g. Although the required film hardness of the hard coat layer 12 is different depending on the use, the level "H" or above is considered satisfactory. The results of the test were shown in the column "film hardness" in the Table 1-2.

(4) Scratch Resistance

A steel wool #0000 was reciprocated across the hard coat layer 12 for 20 times with the load of 200 g/cm$^2$. The scratches formed on the hard coat layer 12 were visually inspected and evaluated by the following criteria. The results were shown in the column "scratch resistance" in the Table 1-2.

A: Excellent, free from scratches

B: Acceptable for practical use, 3 to 7 scratches

C: Not saleable, 8 scratches and above

Example 2

The coating liquid 33 having the composition below was used instead of the sample coating liquid A of the example 1. The coating liquid 33 used was referred to as Sample coating liquid B.

Sample Coating Liquid B

| | |
|---|---|
| Tetramethoxysilane (trade name: KBM-04, manufactured by Shin-Etsu Chemical Co., Ltd.) | 5.0 pts. wt. |
| 3-glycidoxypropyl trimethoxysilane (trade name: KBM-403, manufactured by Shin-Etsu Chemical Co., Ltd.) | 5.0 pts. wt. |
| Acetic acid aqueous solution (acetic acid concentration = 0.3%, pH = 4.1) | 29.2 pts. wt. |
| Hardening agent (trade name: Alumichelate A(W), manufactured by Kawaken Fine Chemicals Co., Ltd.) | 0.4 pts. wt. |
| Colloidal silica (trade name: SNOWTEX O, average particle diameter in a range from 10 nm to 20 nm, solid content concentration of 20%, pH = 2.6, manufactured by Nissan Chemical Industries, Ltd.) | 60.0 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

The sample coating liquid B was applied onto the adhesion layer 13, and heated and dried at 190° C. for 2 minutes. Thereby, the hard coat layer 12 with the thickness of 3.3 μm was formed. Thus, the multilayer film 10 was produced. Other conditions were the same as in the example 1. The evaluations were performed as in the example 1.

Example 3

The coating liquid 33 having the composition below was used instead of the sample coating liquid A of the example 1. The coating liquid 33 used was referred to as sample coating liquid C.

Sample Coating Liquid C

| | |
|---|---|
| Tetraetoxysilane (trade name: KBE-04, manufactured by Shin-Etsu Chemical Co., Ltd.) | 4.0 pts. wt. |
| 3-glycidoxypropyl trimethoxysilane (trade name: KBM-403, manufactured by Shin-Etsu Chemical Co., Ltd.) | 5.0 pts. wt. |
| Acetic acid aqueous solution (acetic acid concentration of 1.0%, pH = 3.5) | 81.1 pts. wt. |
| Hardening agent (phosphoric acid, manufactured by Wako Pure Chemical Industries, Ltd.) | 0.6 pts. wt. |
| Colloidal Silica (trade name: SNOWTEX OS, average particle diameter in a range from 8 nm to 11 nm, solid content concentration of 20%, pH = 2.6, manufactured by Nissan Chemical Industries, Ltd.) | 65.0 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

The sample coating liquid C was applied onto the adhesion layer 13, and heated and dried at 200° C. for 80 seconds. Thereby, the hard coat layer 12 with the thickness of 2.6 μm was formed. Thus, the multilayer film 10 was produced. Other conditions were the same as in the example 1. The evaluations were performed as in the example 1.

Example 4

The coating liquid 33 having the composition below was used instead of the sample coating liquid A of the example 1. The coating liquid 33 used was referred to as sample coating liquid D.

Sample Coating Liquid D

| | |
|---|---|
| Tetramethoxysilane (trade name: KBM-04, manufactured by Shin-Etsu Chemical Co., Ltd.) | 4.0 pts. wt. |

-continued

| | |
|---|---|
| 3-glycidoxypropyl trimethoxysilane (trade name: KBM - 403, manufactured by Shin-Etsu Chemical Co., Ltd.) | 3.0 pts. wt. |
| 3-chloropropyl trimethoxysilane (trade name: KBM-703, manufactured by Shin-Etsu Chemical Co., Ltd.) | 1.0 pts. wt. |
| 3-ureidopropyl triethoxysilane (trade name: KBE-585, 50% methanol solution, manufactured by Shin-Etsu Chemical Co., Ltd.) | 2.0 pts. wt. |
| Acetic acid aqueous solution (Acetic acid concentration of 0.3%, pH = 4.1) | 150 pts. wt. |
| Hardening agent (phosphoric acid, manufactured by Wako Pure Chemical Industries, Ltd.) | 1.0 pts. wt. |
| Colloidal Silica (trade name: SNOWTEX OS, average particle diameter in a range from 8 nm to 11 nm, solid content concentration of 20%, pH = 2.6, manufactured by Nissan Chemical Industries, Ltd.) | 65.0 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

The sample coating liquid D was applied onto the adhesion layer 13, and heated and dried at 190° C. for 2 minutes. Thereby, the hard coat layer 12 with the thickness of 2.1 μm was formed. Thus, the multilayer film 10 was produced. Other conditions were the same as in the example 1. The evaluations were performed as in the example 1.

Example 5

The film base 11 formed by a following method was used instead of the film base 11 of the example 2.

The amorphous base material 51 of the example 2 was sent to the stretching device 53. In the relaxation step in the stretching device 53, the width of the base material 51 was controlled to satisfy $100 \times (Y2-Y1)/100=2.9(\%)$. The first stretching step, the second stretching step, the thermosetting step and the cooling step were the same as in the example 2. The thickness of the formed film base 11 was 125 μm.

The adhesion layer 13 was provided on the film base 11. The heat shrinkage factor (at 170° C., 10 minutes) was obtained. Thereafter, the hard coat layer 12 was provided on the adhesion layer 13 as in the second example 2, and thus the multilayer film 10 was produced. The evaluations were performed as in the example 1.

Example 6

Corona discharge treatment was performed on both surfaces of the film base 11 of the example 2. Thereafter, the adhesive solution 37 was applied onto the both surfaces of the film base 11 with the same conditions as in the example 2. Thus, the adhesion layer 13 with the thickness of 0.1 μm was formed on each surface of the film base 11.

The same coating liquid 33 as in the example 2 was applied onto each of the adhesion layers 13, and heated and dried at 190° C. for 2 minutes. Thereby, the hard coat layer 12 with the thickness of 4.5 μm was formed on each of the film base 11. Other conditions were the same as in the example 2. The evaluations were performed as in the example 1.

Example 7

The film base 11 formed by a following method was used instead of the film base 11 of the example 2.

The amorphous base material 51 of the example 2 was sent to the stretching device 53. In the thermosetting step in the stretching device 53, the base material 51 was heated to 235° C. In the relaxation step, the base material 51 was heated to 210° C. In the relaxation step, the width of the base material 51 was controlled to satisfy the condition $100 \times (Y2-Y1)/100=4.1(\%)$. The first and second stretching steps and the cooling step were the same as in the example 2. The thickness of the formed film base 11 was 188 μm.

The film base 11 was provided with the adhesion layer 13 of the example 2. The heat shrinkage factor (170° C., 10 minutes, unit: %) was calculated. The evaluations were performed as in the example 1.

Example 8

The film base 11 formed by a following method was used instead of the film base 11 of the example 2.

The amorphous base material 51 of the example 2 was sent to the stretching device 53. In the thermosetting step in the stretching device 53, the base material 51 was heated to 245° C. In the relaxation step, the base material 51 was heated to 235° C. In the relaxation step, the width of the base material 51 was controlled to satisfy $100 \times (Y2-Y1)/100=1.4(\%)$. The first and second stretching steps and the cooling step were the same as in the example 2. The thickness of the formed film base 11 was 188 μm.

The same adhesion layer 13 as in the example 2 was provided on the film base 11, and the heat shrinkage factor (170° C., 10 minutes) was calculated. The evaluations were performed as in the example 1.

Example 9

The adhesive solution 37 having the following composition was used instead of the adhesive solution 37 of the example 2. The adhesive solution 37 used was referred to as sample adhesive solution B.

Sample Adhesive Solution B

| | |
|---|---|
| TAKELAC WS-4000 (trade name, solid content concentration of 30%, manufactured by Mitsui Chemicals Inc.) | 7.0 pts. wt. |
| Tin oxide dispersion liquid FS-10D (trade name, solid content concentration of 20%, manufactured by Ishihara Sangyo Kaisha, Ltd.) | 12.0 pts. wt. |
| Surfactant (trade name: Naloacty HN-100, manufactured by Sanyo Chemical Industries, Ltd.) | 0.3 pts. wt. |
| Surfactant (trade name: SANDET BL, solid content concentration of 43%, manufactured by Sanyo Chemical Industries, Ltd.) | 0.3 pts. wt. |
| Water | 74.4 pts. wt. |

After the film base 11 was subjected to the corona discharge treatment, the sample adhesive solution B was applied thereon. Then the film base 11 was heated and dried at 120° C. for 2 minutes. Thereby, the adhesion layer 13 with the thickness T1 of 0.11 μm was formed.

Next, the hard coat layer 12 was formed with the same conditions as in the example 2, and thus the multilayer film 10 was produced. The evaluations were performed as in the example 1.

Example 10

The multilayer film 10 was produced with the same conditions as in the example 2 except that the applied coating liquid 33 of the example 2 was heated and dried at 150° C. for 2 minutes. The evaluations were performed as in the example 1.

Example 11

The coating liquid 33 having the following composition was used instead of the sample coating liquid A of the example 1. The coating liquid 33 used was referred to as sample coating liquid E.

Sample Coating Liquid E

| | |
|---|---|
| Tetraisopropyl orthosilicate (manufactured by Tokyo Chemical Industry Co., Ltd.) | 8.7 pts. wt. |
| 3-glycidoxypropyl trimethoxysilane (trade name: KBM-403, manufactured by Shin-Etsu Chemical Co., Ltd.) | 5.0 pts. wt. |
| Acetic acid aqueous solution (acetic acid concentration = 0.3%, pH = 4.1) | 25.5 pts. wt. |
| Hardening agent (trade name: Alumichelate A(W), manufactured by Kawaken Fine Chemicals Co., Ltd.) | 0.4 pts. wt. |
| Colloidal silica (trade name: SNOWTEX O, average particle diameter in a range from 10 nm to 20 nm, solid content concentration of 20%, pH = 2.6, manufactured by Nissan Chemical Industries, Ltd.) | 60.0 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

The sample coating liquid E was applied onto the adhesion layer 13, and heated and dried at 190° C. for 2 minutes. Thereby, the hard coat layer 12 with the thickness of 3.3 μm was formed, and thus the multilayer film 10 was produced. Other conditions were the same as in the example 1. The evaluations were performed as in the example 1.

Example 12

In this example, the adhesion layer 13 was not provided on the film base 11. Accordingly, the hard coat layer 12 was formed by directly applying the coating liquid 33 onto the film base 11. The coating liquid 33 having the following composition was used instead of the sample coating liquid A. The coating liquid 33 used was referred to as sample coating liquid F. Other conditions were the same as in the example 1. The evaluations were performed as in the example 1. The acetic acid aqueous solution below contained in the sample coating liquid F also serves as a hardening agent.

Sample Coating Liquid F

| | |
|---|---|
| Tetramethoxysilane (trade name: KBM-04, manufactured by Shin-Etsu Chemical Co., Ltd.) | 25.0 pts. wt. |
| 3-glycidoxypropyl trimethoxysilane (trade name: KBM - 403, manufactured by Shin-Etsu Chemical Co., Ltd.) | 5.0 pts. wt. |
| Acetic acid aqueous solution (concentration = 0.05%, pH = 5.2) | 60.0 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration: 43%, manufactured by Sanyo Chemical Industries, Ltd.) | 0.2 pts. wt. |

Example 13

The coating liquid 33 having the following composition was used instead of the sample coating liquid A of the example 1. The coating liquid 33 used was referred to as sample coating liquid G.

Sample Coating Liquid G

| | |
|---|---|
| Tetramethoxysilane (trade name: KBM-04, manufactured by Shin-Etsu Chemical Co., Ltd.) | 5.0 pts. wt. |
| 3-glycidoxypropyl trimethoxysilane (trade name: KBM - 403, manufactured by Shin-Etsu Chemical Co., Ltd.) | 5.0 pts. wt. |
| Acetic acid aqueous solution (acetic acid concentration = 0.3%, pH = 4.1) | 29.2 pts. wt. |
| Hardening agent (trade name: Alumichelate A(W), manufactured by Kawaken Fine Chemicals Co., Ltd.) | 0.4 pts. wt. |
| Colloidal silica (trade name: SNOWTEX O, average particle diameter in a range from 10 nm to 20 nm, solid content concentration of 20%, pH = 2.6, manufactured by Nissan Chemical Industries, Ltd.) | 60.0 pts. wt. |
| Nipol LX407-C5 (trade name, stylene butadiene polymer, solid content concentration of 40%, manufactured by Zeon Corporation) | 0.5 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

The sample coating G was applied onto the adhesion layer 13, and heated and dried at 190° C. for 2 minutes. Thereby, the hard coat layer 12 with the thickness of 3.3 μm was formed, and thus the multilayer film 10 was produced. Other conditions were the same as in the example 1. The evaluations were performed as in the example 1.

Example 14

The coating liquid 33 having the following composition was used instead of the sample coating liquid A used in the example 1. The coating liquid 33 used was referred to as sample coating liquid H.

Sample Coating Liquid H

| | |
|---|---|
| Tetramethoxysilane (trade name: KBM-04, manufactured by Shin-Etsu Chemical Co., Ltd.) | 5.0 pts. wt. |
| 3-glycidoxypropyl methyldiethoxysilane (trade name: KBE - 402, manufactured by Shin-Etsu Chemical Co., Ltd.) | 5.3 pts. wt. |
| Acetic acid aqueous solution (acetic acid concentration = 0.3%, pH = 4.1) | 28.9 pts. wt. |

-continued

| | |
|---|---|
| Hardening agent | 0.4 pts. wt. |
| (trade name: Alumichelate A(W), manufactured by Kawaken Fine Chemicals Co., Ltd.) | |
| Colloidal silica | 60.0 pts. wt. |
| (trade name: SNOWTEX O, average particle diameter in a range from 10 nm to 20 nm, solid content concentration of 20%, pH = 2.6, manufactured by Nissan Chemical Industries, Ltd.) | |
| Surfactant | 0.2 pts. wt. |
| (trade name: Naloacty HN-100, manufactured by Sanyo Chemical Industries, Ltd.) | |
| Surfactant | 0.2 pts. wt. |
| (trade name: SANDET BL, solid content concentration of 43%, manufactured by Sanyo Chemical Industries, Ltd.) | |

The sample coating liquid H was applied onto the adhesion layer 13 of the example 1, and heated and dried at 190° C. for 2 minutes. Thereby, the hard coat layer 12 with the thickness of 2.1 μm was formed, and thus the multilayer film 10 was produced. Other conditions were the same as in the example 1. The evaluations were performed as in the example 1.

Example 15

The film base 11 formed by a following method was used instead of the film base 11 of the example 2.

The amorphous base material 51 of the example 2 was sent to the stretching device 53. In the thermosetting step in the stretching device 53, the base material 51 was heated to 235° C. In the relaxation step, the base material 51 was heated to 190° C. In the relaxation step, the width of the base material 51 was controlled to satisfy the condition $100 \times (Y2-Y1)/100 = 5.5(\%)$. The first and second stretching steps and the cooling step were the same as in the example 2. The thickness of the formed film base 11 was 188 μm.

The film base 11 was provided with the adhesion layer 13 of the example 2. The heat shrinkage factor (170° C., 10 minutes) was calculated. The evaluations were performed as in the example 1.

Example 16

The film base 11 formed by a following method was used instead of the film base 11 of the example 2.

The amorphous base material 51 of the example 2 was sent to the stretching device 53. In the thermosetting step in the stretching device 53, the base material 51 was heated to 250° C. In the relaxation step, the base material 51 was heated to 235° C. In the relaxation step, the width of the base material 51 was controlled to satisfy the condition $100 \times (Y2-Y1)/100 = 0(\%)$. The first and second stretching steps and the cooling step were the same as in the example 2. The thickness of the formed film base 11 was 188 μm.

The film base 11 was provided with the adhesion layer 13 of the example 2. The heat shrinkage factor (170° C., 10 minutes) was calculated. The evaluations were performed as in the example 1.

Example 17

The coating liquid 33 having the following composition was used instead of the sample coating liquid A used in the example 1. The coating liquid 33 used was referred to as sample coating liquid I.

Sample Coating Liquid I

| | |
|---|---|
| Tetraethoxysilane | 6.8 pts. wt. |
| (trade name: KBE-04, manufactured by Shin-Etsu Chemical Co., Ltd.) | |
| 3-glycidoxypropyl trimethoxysilane | 5.0 pts. wt. |
| (trade name: KBM - 403, manufactured by Shin-Etsu Chemical Co., Ltd.) | |
| Acetic acid aqueous solution | 7.1 pts. wt. |
| (acetic acid concentration = 0.3%, pH = 4.1) | |
| Hardening agent | 0.1 pts. wt. |
| (trade name: Alumichelate A(W), manufactured by Kawaken Fine Chemicals Co., Ltd.) | |
| Colloidal silica | 60.0 pts. wt. |
| (trade name: SNOWTEX O, average particle diameter in a range from 10 nm to 20 nm, solid content concentration of 20%, pH = 2.6, manufactured by Nissan Chemical Industries, Ltd.) | |
| Surfactant | 0.2 pts. wt. |
| (trade name: Naloacty HN-100, manufactured by Sanyo Chemical Industries, Ltd.) | |
| Surfactant | 0.2 pts. wt. |
| (trade name: SANDET BL, solid content concentration of 43%, manufactured by Sanyo Chemical Industries, Ltd.) | |

The sample coating liquid I was applied onto the adhesion layer 13, and heated and dried at 190° C. for 2 minutes. Thereby, the hard coat layer 12 with the thickness of 4.8 μm was formed, and thus the multilayer film 10 was produced. Other conditions were the same as in the example 1. The evaluations were performed as in the example 1.

Example 18

The coating liquid 33 having the following composition was used instead of the sample coating liquid A used in the example 1. The coating liquid 33 used was referred to as sample coating liquid J.

Sample Coating Liquid J

| | |
|---|---|
| Tetraethoxysilane | 6.8 pts. wt. |
| (trade name: KBE-04, manufactured by Shin-Etsu Chemical Co., Ltd.) | |
| 3-glycidoxypropyl trimethoxysilane | 5.0 pts. wt. |
| (trade name: KBM - 403, manufactured by Shin-Etsu Chemical Co., Ltd.) | |
| Acetic acid aqueous solution | 236 pts. wt. |
| (acetic acid concentration = 0.3%, pH = 4.1) | |
| Hardening agent | 0.8 pts. wt. |
| (trade name: Alumichelate A(W), manufactured by Kawaken Fine Chemicals Co., Ltd.) | |
| Colloidal silica | 60.0 pts. wt. |
| (trade name: SNOWTEX O, average particle diameter in a range from 10 nm to 20 nm, solid content concentration of 20%, pH = 2.6, manufactured by Nissan Chemical Industries, Ltd.) | |

-continued

| | |
|---|---|
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

The sample coating liquid J was applied onto the adhesion layer 13, and heated and dried at 190° C. for 3 minutes. Thereby, the hard coat layer 12 with the thickness of 2.3 μm was formed, and thus the multilayer film 10 was produced. Other conditions were the same as in the example 1. The evaluations were performed as in the example 1.

Example 19

The film base 11 formed by a following method was used instead of the film base 11 of the example 2.

The amorphous base material 51 of the example 2 was sent to the stretching device 53. In the thermosetting step in the stretching device 53, the base material 51 was heated to 235° C. In the relaxation step, the base material 51 was heated to 200° C. In the relaxation step, the width of the base material 51 was controlled to satisfy the condition 100×(Y2−Y1)/100=5.1(%). The first and second stretching steps and the cooling step were the same as in the example 2. The thickness of the formed film base 11 was 188 μm.

The film base 11 was provided with the adhesion layer 13 of the example 2. The heat shrinkage factor (170° C., 10 minutes) was calculated. The evaluations were performed as in the example 1.

Example 20

The film base 11 formed by a following method was used instead of the film base 11 of the example 2.

The amorphous base material 51 of the example 2 was sent to the stretching device 53. In the thermosetting step in the stretching device 53, the base material 51 was heated to 235° C. In the relaxation step, the base material 51 was heated to 220° C. In the relaxation step, the width of the base material 51 was controlled to satisfy the condition 100×(Y2−Y1)/100=3.6(%). The first and second stretching steps and the cooling step were the same as in the example 2. The thickness of the formed film base 11 was 188 μm.

The film base 11 was provided with the adhesion layer 13 of the example 2. The heat shrinkage factor (170° C., 10 minutes) was calculated. The evaluations were performed as in the example 1.

Comparative Example 1

The film base formed by a following method was used instead of the film base 11 of the example 2.

The amorphous base material 51 of the example 2 was sent to the stretching device 53. In the thermosetting step in the stretching device 53, the base material 51 was heated to 235° C. In the relaxation step, the base material 51 was heated to 180° C. In the relaxation step, the width of the base material 51 was controlled to satisfy the condition 100×(Y2−Y1)/100=8.0(%). The first and second stretching steps and the cooling step were the same as in the example 2. The thickness of the formed film base was 188 μm.

The film base was provided with the adhesion layer 13 of the example 2. The heat shrinkage factor (170° C., 10 minutes, unit: %) of the film base with the adhesion layer 13 was calculated. The hard coat layer 12 was provided on the adhesion layer 13 as with the example 2, and thus the multilayer film was produced. The evaluations were performed as in the example 1.

Comparative Example 2

The coating liquid having the following composition was used instead of the sample coating liquid A used in the example 1. The coating liquid used was referred to as sample coating liquid K.

Sample Coating Liquid K

| | |
|---|---|
| Tetramethoxysilane (trade name: KBM-04, manufactured by Shin-Etsu Chemical Co., Ltd.) | 5.0 pts. wt. |
| 3-glycidoxypropyl trimethoxysilane (trade name: KBM - 403, manufactured by Shin-Etsu Chemical Co., Ltd.) | 5.0 pts. wt. |
| Acetic acid aqueous solution (acetic acid concentration = 0.3%, pH = 4.1) | 5.2 pts. wt. |
| Hardening agent (trade name: Alumichelate A(W), manufactured by Kawaken Fine Chemicals Co., Ltd.) | 0.4 pts. wt. |
| Colloidal silica (trade name: SNOWTEX O, average particle diameter in a range from 10 nm to 20 nm, solid content concentration of 20%, pH = 2.6, manufactured by Nissan Chemical Industries, Ltd.) | 60.0 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |
| Water | 24.0 pts. wt. |

The sample coating liquid K was applied onto the adhesion layer 13 of the example 1, and heated and dried at 190° C. for 2 minutes. Thereby, the hard coat layer with the thickness of 2.1 μm was formed, and thus the multilayer film was produced. Other conditions were the same as in the example 1. The evaluations were performed as in the example 1.

Comparative Example 3

The coating liquid having the following composition was used instead of the sample coating liquid A used in the example 1. The coating liquid used was referred to as sample coating liquid L.

Sample Coating Liquid L

| | |
|---|---|
| Tetramethoxysilane (trade name: KBM-04, manufactured by Shin-Etsu Chemical Co., Ltd.) | 5.0 pts. wt. |
| 3-glycidoxypropyl trimethoxysilane (trade name: KBM - 403, manufactured by Shin-Etsu Chemical Co., Ltd.) | 5.0 pts. wt. |
| Distilled water | 29.2 pts. wt. |
| Hardening agent (trade name: Alumichelate A(W), manufactured by Kawaken Fine Chemicals Co., Ltd.) | 0.4 pts. wt. |
| Colloidal silica (trade name: SNOWTEX O, average particle diameter in a range from 10 nm to 20 nm, solid content concentration of 20%, pH = 2.6, manufactured by Nissan Chemical Industries, Ltd.) | 60.0 pts. wt. |

-continued

| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

As described above, in the comparative example 3, distilled water was used instead of the acid water 64. In the cell of the column "acid water" in the Table 1-1, the amount "0" represents the amount of the acid water 64, and the amount "29.2" in parentheses represents the amount of the distilled water. The sample coating liquid L was applied onto the adhesion layer 13 of the example 1, and heated and dried at 190° C. for 2 minutes. Thereby, the hard coat layer with the thickness of 3.3 μm was formed, and thus the multilayer film was produced. Other conditions were the same as in the example 1. The evaluations were performed as in the example 1.

Comparative Example 4

The coating liquid having the following composition was used instead of the sample coating liquid A used in the example 1. The coating liquid used was referred to as sample coating liquid M.

Sample Coating Liquid M

| 3-glycidoxypropyl triethoxysilane (trade name: KBE - 403, manufactured by Shin-Etsu Chemical Co., Ltd.) | 10.0 pts. wt. |
| Acetic acid aqueous solution (acetic acid concentration: 1.0%, pH = 4.1) | 29.2 pts. wt. |
| Hardening agent (trade name: Alumichelate A(W), manufactured by Kawaken Fine Chemicals Co., Ltd.) | 0.4 pts. wt. |
| Colloidal silica (trade name: SNOWTEX O, average particle diameter in a range from 10 nm to 20 nm, solid content concentration of 20%, pH = 2.6, manufactured by Nissan Chemical Industries, Ltd.) | 60.0 pts. wt. |
| Surfactant (trade name: Naloacty HN-100, manufactured by Sanyo Chemical Industries, Ltd.) | 0.2 pts. wt. |
| Surfactant (trade name: SANDET BL, solid content concentration of 43%, manufactured by Sanyo Chemical Industries, Ltd.) | 0.2 pts. wt. |

As described above, in the comparative example 4, tetraalkoxysilane was not used (0 pts. wt.). In the Table 1-1, an amount 10.0 (unit: pts. wt.) of 3-glycidoxypropyl triethoxysilane was shown in parentheses in the cell of the column "alkoxysilane". The sample coating liquid M was applied onto the adhesion layer 13 of the example 1, and heated and dried at 190° C. for 2 minutes. Thereby, the hard coat layer 12 with the thickness of 2.1 μm was formed, and thus the multilayer film was produced. Other conditions were the same as in the example 1. The evaluations were performed as in the example 1.

In the Table 1-1, the column "alkoxysilane" represents the amount (unit: pts. wt.) of alkoxysilane contained in the coating liquid, namely, the total amount of the organic silicon compound represented by the general formula (1) and the tetraalkoxysilane. The column "acid water" represents the amount (unit: pts. wt.) of the acid water 64 contained in the coating liquid.

TABLE 1-1

| | coating liquid | | film base heat shrinkage factor | | refractive index of adhesion layer |
|---|---|---|---|---|---|
| | alkoxysilane (pts. wt.) | acid water (pts. wt.) | MD (%) | TD (%) | |
| E1 | 10 | 10 | 1.2 | 1.0 | 1.53 |
| E2 | 10 | 29.2 | 1.2 | 1.0 | 1.53 |
| E3 | 9 | 81.1 | 1.2 | 1.0 | 1.53 |
| E4 | 10 | 150 | 1.2 | 1.0 | 1.53 |
| E5 | 10 | 29.2 | 1.3 | 1.2 | 1.53 |
| E6 | 10 | 29.2 | 1.2 | 1.0 | 1.53 |
| E7 | 10 | 29.2 | 0.9 | 0.4 | 1.53 |
| E8 | 10 | 29.2 | 1.2 | 1.8 | 1.53 |
| E9 | 10 | 29.2 | 1.2 | 1.0 | 1.56 |
| E10 | 10 | 29.2 | 1.2 | 1.0 | 1.53 |
| E11 | 13.7 | 25.5 | 1.2 | 1.0 | 1.53 |
| E12 | 30 | 60 | 1.2 | 1.0 | 1.53 |
| E13 | 10 | 29.2 | 1.2 | 1.0 | 1.53 |
| E14 | 10.3 | 28.9 | 1.2 | 1.0 | 1.53 |
| E15 | 10 | 29.2 | 0.8 | 0.06 | 1.53 |
| E16 | 10 | 29.2 | 1.2 | 2.4 | 1.53 |
| E17 | 10 | 6 | 1.2 | 1.0 | 1.53 |
| E18 | 10 | 200 | 1.2 | 1.0 | 1.53 |
| E19 | 10 | 29.2 | 0.8 | 0.11 | 1.53 |
| E20 | 10 | 29.2 | 1.0 | 0.75 | 1.53 |
| C1 | 10 | 29.2 | 0.8 | −0.03 | 1.53 |
| C2 | 10 | 5.2 | 1.2 | 1.0 | 1.53 |
| C3 | 10 | 0 (29.2) | 1.2 | 1.0 | 1.53 |
| C4 | (10) | 29.2 | 1.2 | 1.0 | 1.53 |

TABLE 1-2

| | evaluations | | | |
|---|---|---|---|---|
| | stability (unit: day) | cracks | film hardness | scratch resistance |
| E1 | 20 or more | A | 2H | A |
| E2 | 30 or more | A | 3H | A |
| E3 | 30 or more | A | H | A |
| E4 | 30 or more | A | H | A |
| E5 | 30 or more | A | 3H | A |
| E6 | 30 or more | A | 3H | A |
| E7 | 30 or more | A | 3H | A |
| E8 | 30 or more | A | 3H | A |
| E9 | 30 or more | A | 3H | A |
| E10 | 30 or more | A | H | B |
| E11 | 30 or more | A | 3H | A |
| E12 | 20 or more | A | H | B |
| E13 | 30 or more | A | 2H | A |
| E14 | 40 or more | A | H | B |
| E15 | 30 or more | B | 3H | A |
| E16 | 30 or more | A | 3H | A |
| E17 | 30 or more | A | 3H | A |
| E18 | 30 or more | A | 2H | A |
| E19 | 30 or more | B | 3H | A |
| E20 | 30 or more | A | 3H | A |
| C1 | 30 or more | C | 3H | A |
| C2 | 6 | A | 2H | A |
| C3 | 2 | A | 2H | A |
| C4 | 40 or more | A | HB | C |

Although the coating liquid used in the present invention is aqueous, it is excellent in stability as described in the above examples and comparative examples. There is almost no limitation in an amount of storage time of the coating liquid before use, and it is not necessary to change production conditions due to the changes in the conditions of the coating liquid during the continuous production of the multilayer film. The produced multilayer film is free from cracks and has excellent film hardness and scratch resistance. In addition, the multilayer film has the hard coat layer having excellent optical transmission, scratch resistance and durability.

Various changes and modifications are possible in the present invention and may be understood to be within the present invention.

INDUSTRIAL APPLICABILITY

The present invention is preferably applied to polymer films used as window films, touch panel films, ITO substrate films, membrane switch films, 3-dimensional decoration films, optical functional films for flat panel displays and the like.

The invention claimed is:

1. A multilayer film comprising:
a film base formed from a polymer compound, a heat shrinkage factor of said film base after being heated at 170° C. for 10 minutes being in a range from 0.05% to 3.0%;
a hard coat layer formed by applying a water-based coating liquid onto said film base and drying said applied coating liquid, said coating liquid not containing an organic solvent but containing a water soluble hardening agent and alkoxysilane aqueous solution in which an organic silicon compound represented by a general formula (I) and tetraalkoxysilane are dissolved in an acid aqueous solution having a pH in a range from 2 to 6, said hardening agent promoting dehydrating condensation of silanol generated by hydrolysis of said organic silicon compound and said tetraalkoxysilane, an amount of said acid aqueous solution being in a range from 100 parts by weight to 1500 parts by weight where a total amount of said organic silicon compound and said tetraalkoxysilane is 100 parts by weight, $$R^1R^2{}_n Si(OR^3)_{3-n} \quad (1)$$

wherein $R^1$ is an organic group having 1 to 15 carbons and containing no amino group, and $R^2$ is a methyl group or ethyl group, and $R^3$ is an alkyl group having 1 to 3 carbons, and n is zero or 1.

2. The multilayer film of claim 1, wherein said tetraalkoxysilane is one of tetramethoxysilane or tetraethoxysilane.

3. The multilayer film of claim 1, wherein said hardening agent is a compound containing at least one of boron, phosphorus, or aluminum.

4. The multilayer film of claim 1, wherein said polymer compound is polyethylene terephthalate or polyethylene naphthalate.

5. The multilayer film of claim 4, wherein said film base has an adhesion layer on its surface onto which said coating liquid is to be applied, and said adhesion layer has a refractive index in a range from 1.54 to 1.64.

6. The multilayer film of claim 1, wherein said coating liquid contains colloidal silica whose colloidal particles dispersed in water has an average particle diameter in a range from 3 nm to 50 nm.

7. The multilayer film of claim 6, wherein said coating liquid consists only of said alkoxysilane aqueous solution, said hardening agent, said colloidal silica, and a surfactant.

8. The multilayer film of claim 1, wherein said coating liquid contains a water soluble or water dispersible polymer.

9. A method for producing a multilayer film having a film base and a hard coat layer, comprising the steps of:
dissolving an organic silicon compound represented by a general formula (I) and tetraalkoxysilane in an acid aqueous solution having a pH in a range from 2 to 6, an amount of said acid aqueous solution being in a range from 100 parts by weight to 1500 parts by weight where a total amount of said organic silicon compound and said tetraalkoxysilane being 100 parts by weight, $$R^1R^2{}_n Si(OR^3)_{3-n} \quad (1)$$

wherein $R^1$ is an organic group having 1 to 15 carbons and containing no amino group, and $R^2$ is a methyl group or ethyl group, and $R^3$ is an alkyl group having 1 to 3 carbons, and n is zero or 1;
preparing a water-based coating liquid that does not contain an organic solvent by adding a water soluble hardening agent to alkoxysilane aqueous solution obtained by said dissolution;
applying said coating liquid onto said film base formed from a polymer compound and drying said applied coating liquid to form said hard coat layer, a heat shrinkage factor of said film base after being heated at 170° C. for 10 minutes being in a range from 0.05% to 3.0%, wherein said hardening agent promotes dehydrating condensation of silanol generated by hydrolysis of said organic silicon compound and said tetraalkoxysilane.

10. The method of claim 9, wherein said applied coating liquid is heated to a temperature in a range from 160° C. to 220° C. and dried.

* * * * *